United States Patent [19]

Aihara et al.

[11] Patent Number: 5,144,849
[45] Date of Patent: Sep. 8, 1992

[54] REDUCTION GEAR

[75] Inventors: Tsutomu Aihara; Akihiro Takeda, both of Yokohama, Japan

[73] Assignee: Ohi Seisakusho Co., Ltd., Yokohama, Japan

[21] Appl. No.: 712,443

[22] Filed: Jun. 10, 1991

[30] Foreign Application Priority Data

Jun. 15, 1990 [JP] Japan .................. 2-156938

[51] Int. Cl.$^5$ ............... B60N 2/06; F16H 55/22
[52] U.S. Cl. ................... 74/89.14; 74/89.17; 74/425; 248/429; 297/330; 384/610; 384/616; 384/427
[58] Field of Search ........ 74/89.14, 89.17, 425, 74/500; 248/429; 297/330; 384/610, 616, 427

[56] References Cited

U.S. PATENT DOCUMENTS

| | | | |
|---|---|---|---|
| 1,181,384 | 5/1916 | Heaslet | 74/425 |
| 1,520,679 | 12/1924 | Tenney | 74/500 |
| 1,843,081 | 1/1932 | Denyes | 74/500 |
| 2,232,157 | 2/1941 | Anton | 74/425 X |
| 2,724,283 | 11/1955 | Kuboske | 74/425 |
| 3,277,678 | 10/1966 | Booth | 74/89.14 X |
| 3,455,174 | 7/1969 | Pickles | 74/89.14 |
| 3,635,100 | 1/1972 | Littmann | 74/425 X |
| 4,566,576 | 1/1986 | Moriya et al. | 192/84 |
| 4,863,209 | 9/1989 | Deegener | 248/429 X |
| 4,909,468 | 3/1990 | Aihara et al. | 248/429 |

FOREIGN PATENT DOCUMENTS

| | | | |
|---|---|---|---|
| 63-38047 | 2/1988 | Japan | 248/429 |
| 1-143444 | 10/1989 | Japan . | |
| 2193630 | 2/1988 | United Kingdom | 248/429 |

*Primary Examiner*—Allan D. Herrmann
*Attorney, Agent, or Firm*—Foley & Lardner

[57] ABSTRACT

A reduction gear is shown, which is designed to facilitate assembly of essential parts in a case. The reduction gear comprises a worm; a worm wheel meshed with the worm; a lower case part having a semicylindrical recess which rotatably receives the worm, and an upper case part to be mounted on the lower case part to close the semicylindrical recess. The semicylindrical recess has an opening which is so sized as to permit insertion of the worm into the semicylindrical recess therethrough. A threaded bore is formed in the lower case part, which is merged and aligned with the semicylindrical recess. A bolt is screwed into the threaded bore having its inside end pressed against one axial end of the worm for achieving a stable rotation of the worm in the semicylindrical recess.

12 Claims, 10 Drawing Sheets

REDUCTION GEAR

BACKGROUND OF THE INVENTION

1. Field of the Invention

The present invention relates in general to reduction gears, and more particularly, to reduction gears of a type which generally comprises a worm and a worm wheel which are operatively engaged and installed in a case. More specifically, the present invention is concerned with reduction gears which are designed to facilitate assembly of parts in a case.

2. Description of the Prior Art

Japanese Utility Model First Provisional Publication 1-143444 shows one conventional reduction gear of the above-mentioned type.

This conventional reduction gear comprises generally a worm to which an input shaft is coaxially fixed, a worm wheel with which the worm is operatively engaged, and a case in which the worm and the worm wheel are installed. The case is formed with an elongate through bore. A generally middle part of the bore constitutes a cylindrical open portion which rotatably and coaxially receives the worm. One end portion of the bore is threaded for detachably receiving a worm bearing bolt. Upon assembly, the worm bearing bolt bears one axial end of the worm to suppress play of the worm.

However, due to its inherent construction, the conventional reduction gear has the following drawbacks.

That is, in order to properly set or assemble the worm in the cylindrical open portion of the bore, the worm should be inserted into the bore from the threaded end portion of the same. Furthermore, this insertion should be made with the worm being rotated about its axis. In fact, because, at the assembly time, the worm wheel is held stationarily in the case, the insertion of the worm into the bore is permitted only when the worm is rotated about its axis in a certain direction. That is, due to rotation of the worm, the external threads of the worm travel in and along the external threads of the worm wheel, which induces the axial movement of the worm in the bore toward the cylindrical open portion. This assembly work is very difficult or at least troublesome.

Furthermore, because the area where the worm bearing bolt bears the worm is not viewed from outside of the case, it is difficult or at least troublesome to obtain a proper bearing of the bolt against the worm.

SUMMARY OF THE INVENTION

It is therefore an object of the present invention to provide a reduction gear which is free of the above-mentioned drawbacks.

According to a first aspect of the present invention, there is provided a reduction gear which comprises a worm; a worm wheel meshed with the worm; a lower case part having a semicylindrical recess which is shaped and sized to rotatably receive the worm, the semicylindrical recess having an opening which is so sized as to permit insertion of the worm into the semicylindrical recess therethrough, the lower case further having another recess for rotatably receiving the worm wheel; an upper case part which is to be mounted on the lower case part to close the semicylindrical recess of the lower case part; means for defining in the lower case part a threaded bore which is merged and aligned with the semicylindrical recess; a bolt screwed into the threaded bore, the bolt having an inside end which presses one axial end of the worm for achieving a stable rotation of the worm in the semicylindrical recess; bearing means disposed between the inside end of the bolt and the one axial end of the worm for assuring the stable rotation of the worm in the semicylindrical recess; and holding means for stationarily holding the bolt at a given position.

According to a second aspect of the present invention, there is provided a power seat slide device for a motor vehicle, which comprises a lower rail secured to a floor of the vehicle, the lower rail having a longitudinally extending rack; an upper rail slidably engaged with the lower rail and supporting thereon the seat; a power unit mounted to the seat; a power transmission cable extending from the power unit; and a reduction gear mounted on the upper rail and driven by the power unit through the power transmission cable; and a pinion driven by the reduction gear and meshed with the rack of the lower rail, wherein the reduction gear comprising: a worm; a worm wheel meshed with the worm; a lower case part secured to the upper rail and having a semicylindrical recess which is shaped and sized to rotatably receive the worm, the semicylindrical recess having an opening which is so sized as to permit insertion of the worm into the semicylindrical recess therethrough, the lower case further having another recess for rotatably receiving the worm wheel; an upper case part which is to be mounted on the lower case part to close the semicylindrical recess of the lower case part; means for defining in the lower case part a threaded bore which is merged and aligned with the semicylindrical recess; a bolt screwed into the threaded bore, the bolt having an inside end which presses one axial end of the worm for achieving a stable rotation of the worm in the semicylindrical recess; bearing means disposed between the inside end of the bolt and the one axial end of the worm for assuring the stable rotation of the worm in the semicylindrical recess; and holding means for stationarily holding the bolt at a given position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 12, there is shown a first embodiment of the present invention, which is a reduction gear practically applied to a power seat slide device.

Figure 3:
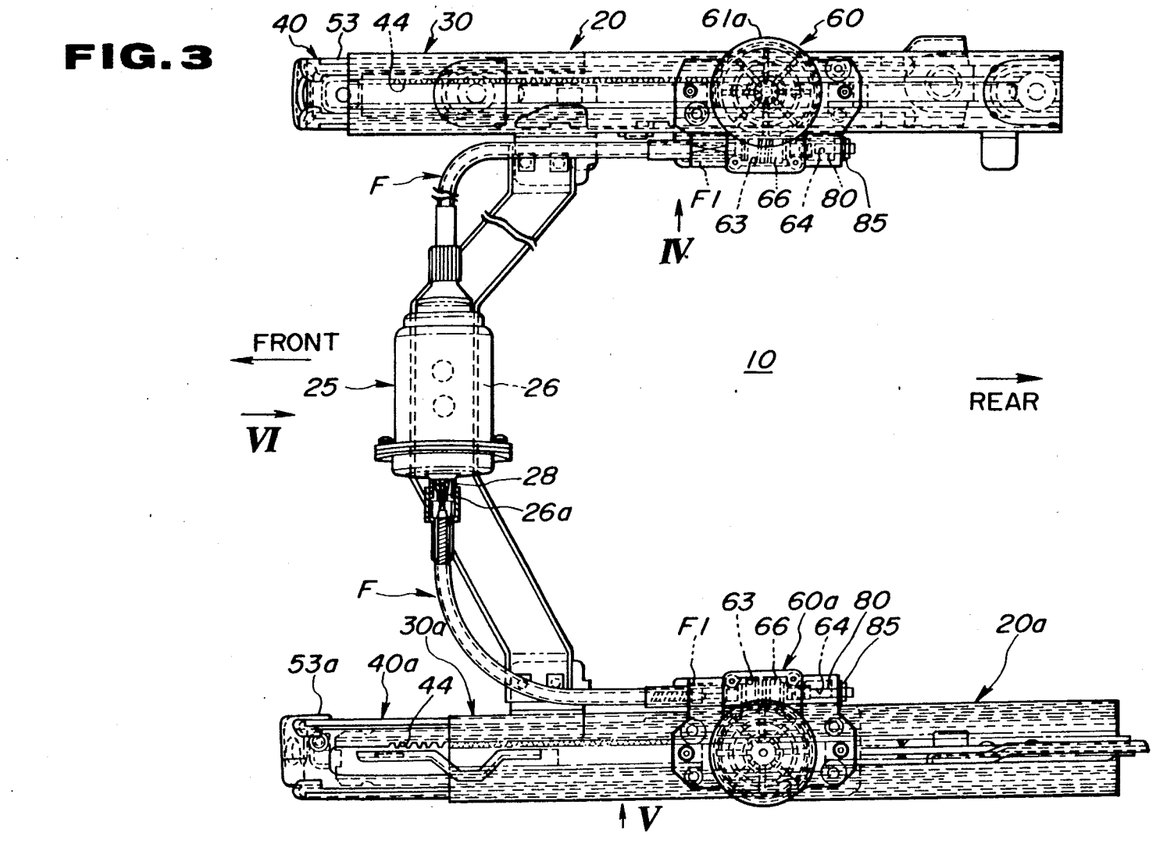
FIG. 3 is a plan view of a power seat slide device to which two reduction gears of the first embodiment are practically applied.
Figure 4:
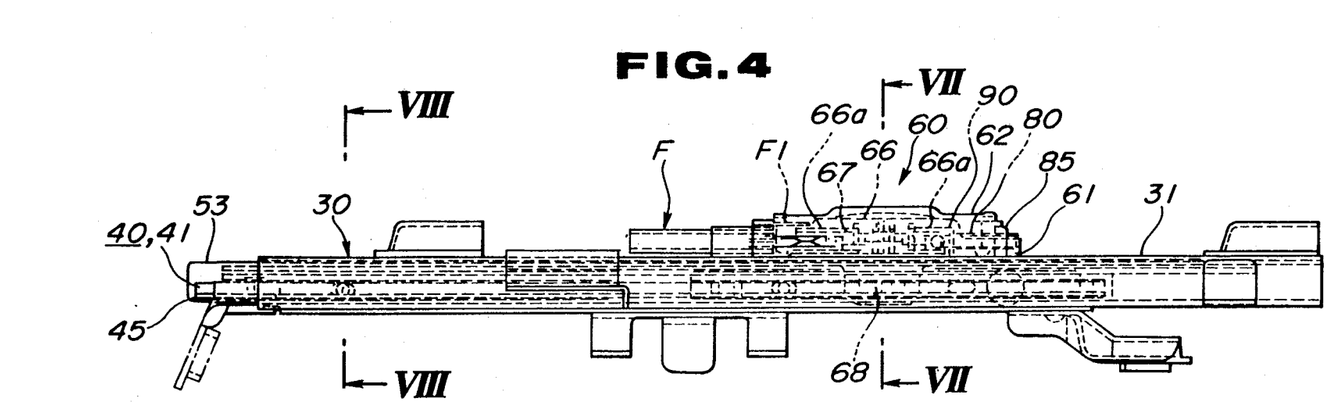
FIG. 4 is a view taken from the direction of the arrow "IV" of FIG. 3.
Figure 5:
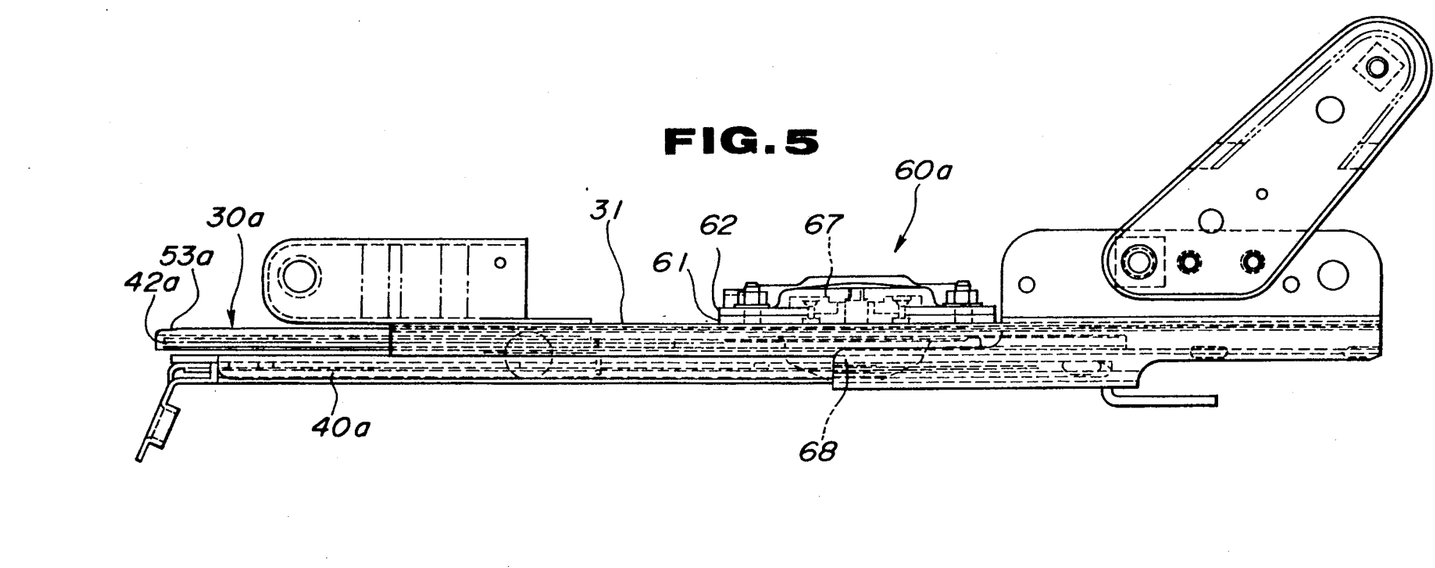
FIG. 5 is a view taken from the direction of the arrow "V" of FIG. 3.
Figure 6:
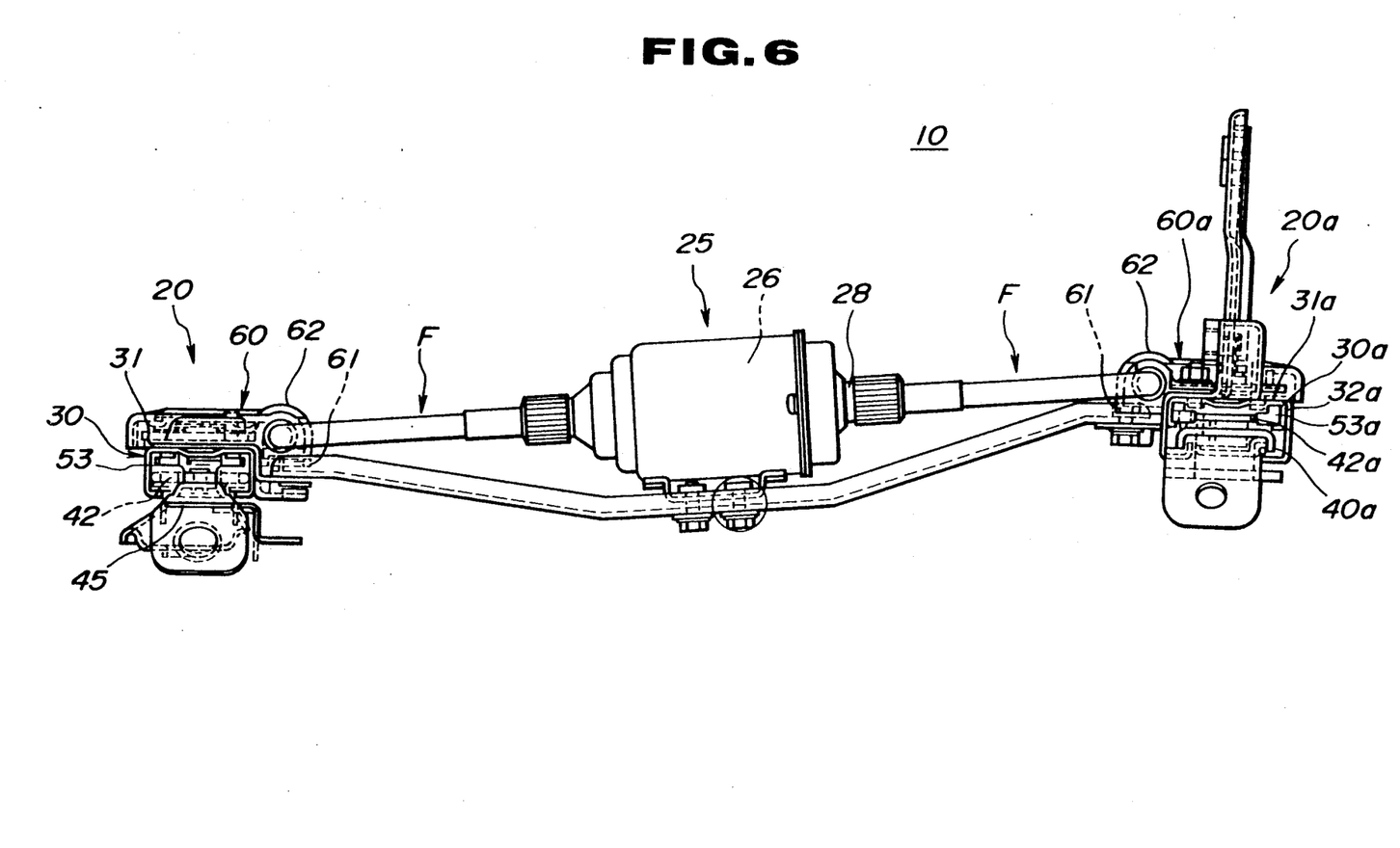
FIG. 6 is a front view taken from the direction of the arrow "VI" of FIG. 3.

As is seen from FIG. 3, the power seat slide device 10 generally comprises two or right and left parallel rail units 20 and 20a which are mounted on a vehicle floor. Although not shown in the drawing, a seat is mounted on the two rail units 20 and 20a. A power unit 25 is mounted to a front lower portion of the seat, from which two flexible drive cables F extend to the rail units 20 and 20a.

The two rail units 20 and 20a are substantially the same in construction except the matter regarding the symmetrical relation therebetween.

Thus, in the following, description on structure of the rail units 20 and 20a will be directed to only the right rail unit 20 for facilitation of the description.

The rail unit 20 comprises an elongate upper rail 30 secured to a lower portion of the seat, and an elongate lower rail 40 secured to the vehicle floor. The upper rail 30 is slidably engaged with the lower rail 40, so that the seat is movable forward and rearward relative to the vehicle floor.

The movement of the upper rail 30 relative to the lower rail 40 is carried out by the power unit 25.

The power unit 25 comprises an electric motor 26 installed in a housing. The housing has at each axial end a connecting collar 28 secured thereto. The electric motor 26 in the housing has a drive shaft 26a each end of which is projected into the connecting collar 28. A flexible cable F is coaxially connected to the end of the drive shaft 26a. A sleeve of the flexible cable F has an enlarged terminal end which is coupled with the connecting collar 28. Thus, upon energization of the motor 26, the flexible cable F is rotated about its axis.

Figure 8:
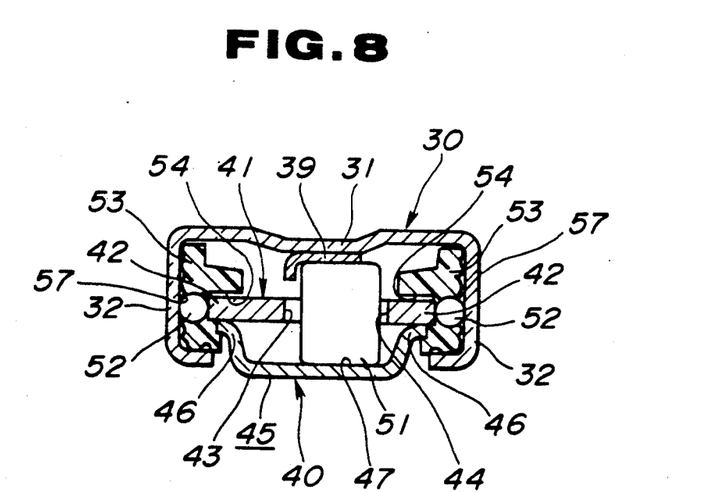
FIG. 8 is a sectional view taken along the line VIII—VIII of FIG. 4.

As is seen from FIG. 8, the upper rail 30 is of a channel structure, which comprises an elongate flat main portion 31 and elongate side wall portions 32 which downwardly extend from respective side ends of the flat main portion 31. Each side wall portion 32 has an inwardly bent lower portion (no numeral), so that each side wall portion 32 and the side part of the flat main portion 31 constitute a channel structure which serves as a guide truck for balls 52 and plastic sliders 53 as will be clarified hereinafter.

The lower rail 40 comprises generally an elongate rail proper 45 and an elongate reinforcing plate 41 which is mounted on and secured to the rail proper 45 to constitute a robust rail structure. The rail proper 45 is formed with raised side walls. Each side wall of the rail proper 45 has an outwardly bent upper portion 46 which supports one side of the reinforcing plate 41 thereby to constitute a holding base 42 for the plastic sliders 53. That is, upon assembly, the holding bases 42 of the lower rail 40 are respectively placed in the channel structures of the upper rail 30, as is understood from FIG. 8.

The reinforcing plate 41 of the lower rail 40 is formed with a longitudinally extending slot 43. One side edge of the slot 34 is formed with a plurality of teeth which constitute a rack 44.

Figure 7:
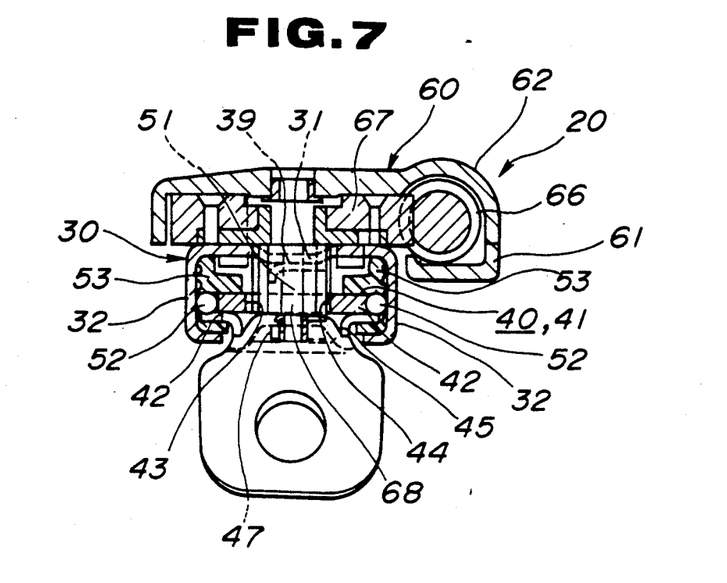
FIG. 7 is a sectional view taken along the line VII—VII of FIG. 4.

As is understood from FIGS. 3 and 7, the upper rail 30 has a drive device 60 mounted thereto, to which the flexible cable F from the above-mentioned power unit 25 is connected.

As is seen from FIG. 8, the rail proper 45 of the lower rail 40 has a main flat surface 47 which extends longitudinally in parallel with the elongate flat main portion 31 of the upper rail 30.

An elongate contact plate 39 is secured to a lower surface of the flat main portion 31 of the upper rail 30. An inner side of the plate 39 is bent downward to form a flange (no numeral) for the purpose which will be clarified hereinafter.

A plurality of metal rollers 51 are put in the slot 34 of the reinforcing plate 41 of the lower rail 40 and disposed between the main flat surface 47 of the lower rail 40 and the contact plate 39 of the upper rail 30. Thus, any load vertically applied to the upper rail 30 is transmitted to the lower rail 40 through the rollers 51. Due to provision of the flange of the contact plate 39, an inward displacement of the rollers 51 is restricted.

As is best seen from FIG. 8, between each side wall portion 32 of the upper rail 30 and the corresponding outer side of the reinforcing plate 41 of the lower rail 40, there are intimately interposed a plurality of metal balls 52. Thus, any load laterally applied to the upper rail 30 is transmitted to the lower rail 40 through the balls 52.

Figure 9:
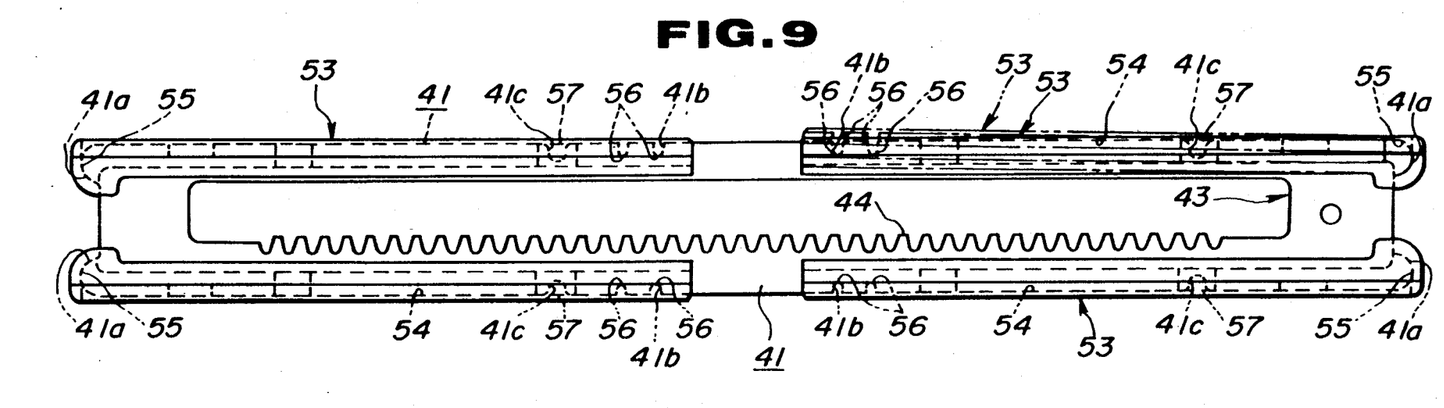
FIG. 9 is a horizontally cut plan view of one rail unit, showing plastic sliders and their associated parts.

As is seen from FIGS. 8 and 9, particularly FIG. 9, two pairs of plastic sliders 53 are respectively mounted to both sides of front and rear halves of the lower rail 40, which are slidably received in the side wall portions 32 of the upper rail 30. For assuring mounting of the plastic sliders 53 to the lower rail 40, each plastic slider 53 is formed with an elongaste groove 54 into which the corresponding side portion of the lower rail 40 is received.

Figure 10:
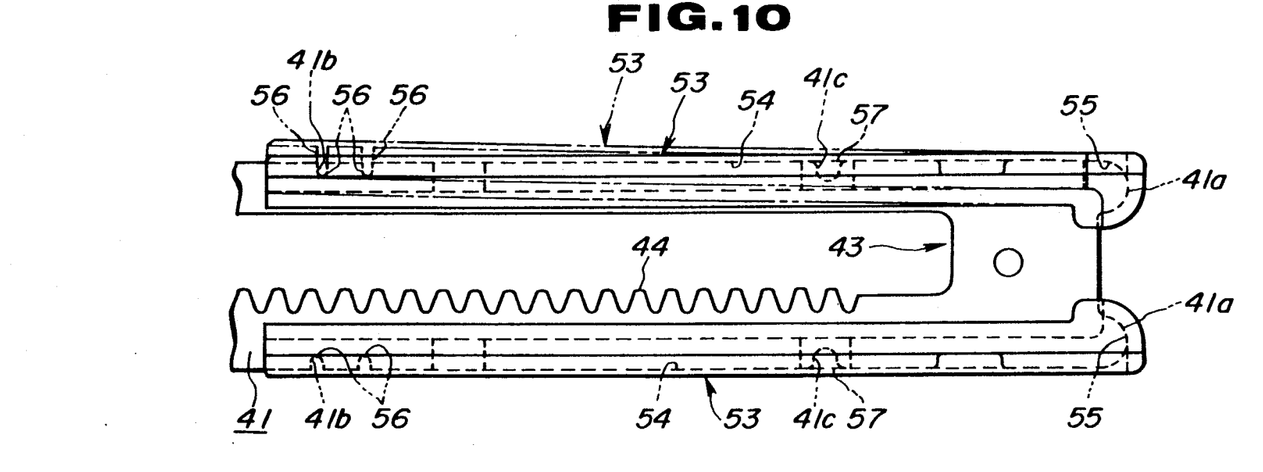
FIG. 10 is an enlarged view of a part of FIG. 9.

As is seen from FIGS. 9 and 10, the reinforcing plate 41 of the lower rail 40 is formed at its front and rear shoulder portions with rounded projections 41a, each projecting longitudinally outwardly. Furthermore, the reinforcing plate 41 is formed at its longitudinally middle side portions with a plurality of cuts 41b.

Each plastic slider 53 has at its terminal end a grooved enlarged portion 55 in which the corresponding rounded projection 41a of the lower rail 40 is snugly received to achieve a latched engagement therebetween. The plastic slider 53 further has at a longitudinally inside end portion a plurality of projections 56 which are latchingly engageable with the cuts 41b of the lower rail 40.

That is, in order to assemble or mount each plastic slider 53 to the lower rail 40, the grooved enlarged portion 55 of the plastic slider 53 is at first snugly received on the corresponding rounded projection 41a of the reinforcing plate 41, then the entire of the plastic slider 53 is pushed against the reinforcing plate 41 of the lower rail 40 in a manner to permit a pivoting of the slider 53 about the rounded projection 41a. With this, the projections 56 of the plastic slider 53 are brought into latching engagement with the corresponding cuts 41b of the lower rail 40. Due to the engagement between the grooved enlarged portion 55 of the plastic slider 53 and the rounded projection 41a of the lower rail 40 and that between the projections 56 of the slider 53 and the cuts 41b of the lower rail 40, longitudinal displacement of each plastic slider 53 relative to the lower rail 40 is assuredly prevented.

As is seen from FIG. 9, each plastic slider 53 is formed at an outer side with two cuts 57 for rotatably receiving the balls 52. The reinforcing plate 41 of the lower rail 40 is formed at portions correspecting to the cuts 57 of each plastic slider 53 with recessed portions 41c.

As is seen from FIGS. 3 and 7, the drive device 60 comprises a case 61a, a worm 66 installed in the case 61a, a worm wheel 67 installed in the case 61a and meshed with the worm 66, and a pinion 68 driven by the worm wheel 67. The worm 66 is driven by the flexible drive cable F from the power unit 25, and the pinion 68 is meshed with the rack 44 of the reinforcing plate 41 of the lower rail 40.

The case 61a, the worm 66 and the worm wheel 67 constitute a reduction gear of the present invention.

As is seen from FIGS. 1, 3 to 7, the case 61a comprises an upper case part 62 and a lower case part 61 which are coupled.

As is seen from FIG. 7, the lower case part 61 is securely mounted on the flat main portion 31 of the upper rail 30.

Figure 2:
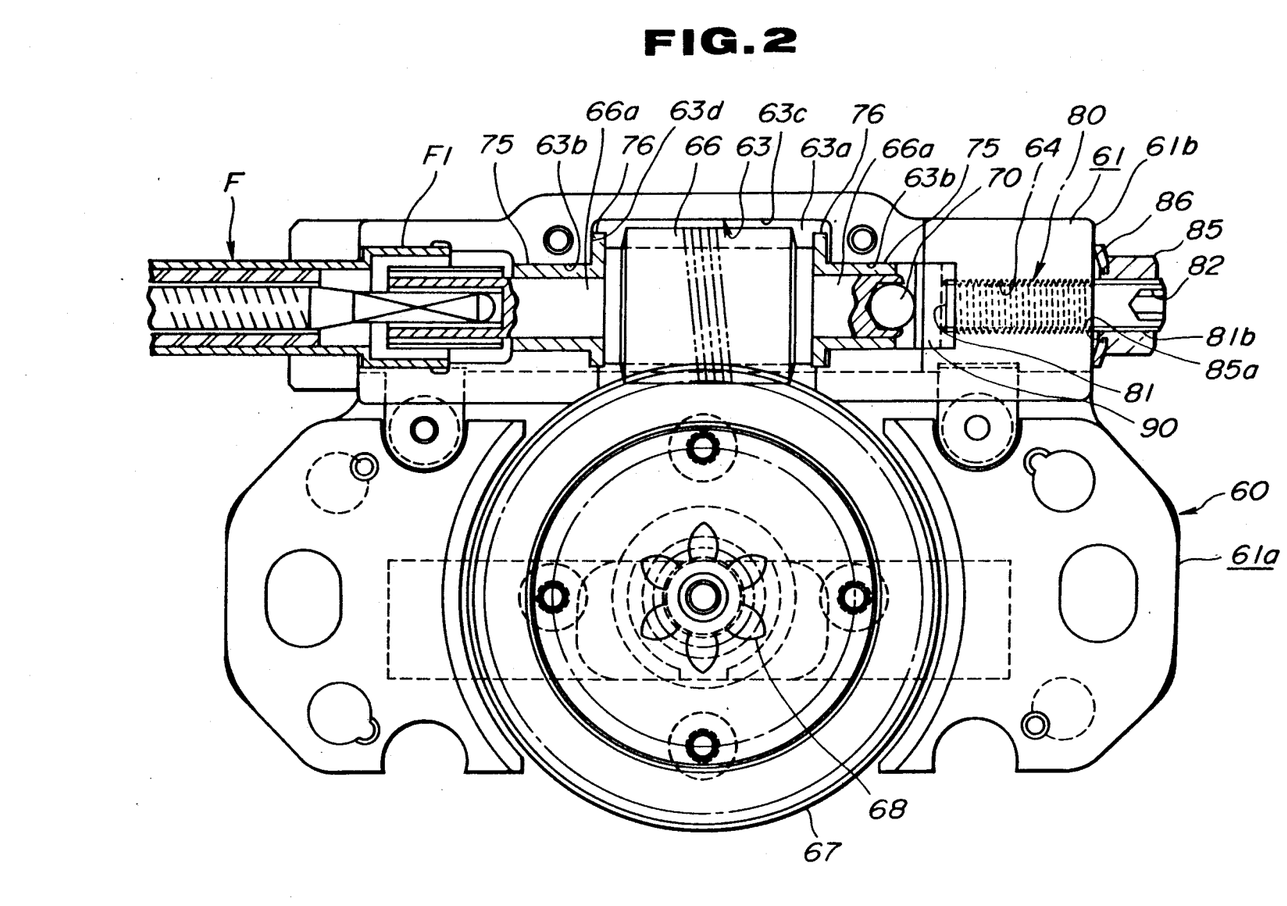
FIG. 2 is an enlarged view of an essential portion of the reduction gear of the first embodiment.

As is seen from FIG. 2, the lower case part 61 is formed with a recess 63 which faces upward for receiving the worm 66 thereinto from above. The recess 63 is so sized as to partically receive the worm 66. The recess 63 comprises a semicylindrical larger portion 63a into which a major portion of the worm 66 is received, and front and rear semicylindrical smaller portions 63b which are positioned at axially both sides of the larger portion 63a for receiving a rotation shaft 66a of the worm 66.

The upper case part 62 is mounted on the lower case part 61 to close the opening 63c of the recess 63 of the lower case part 61. The upper case part 62 is formed at its lower side with a recess which is symmetric with the recess 63 of the lower case part 61, so that the assembled upper and lower case parts 62 and 61 can form a cylindrical space for fully receiving the worm 66.

As is seen from FIG. 2, the flexible drive cable F from the power unit 25 is fixed to one end of the rotation shaft 66a of the worm 66. As shown, the terminal end F1 of the sleeve of the cable F is enlarged and received in an enlarged bore part of the case 61a. With this, disconnection of the cable F from the case 61a is prevented. The other end of the rotation shaft 66a of the worm 66 has a bore in which a bearing ball 70 is partially received.

The rotation shaft 66a of the worm 66 has front and rear sleeves 75 disposed thereabout. Each sleeve 75 has at an inside end a flange 76 which is in contact with the major portion of the worm 66.

The lower case part 61 is further formed with a threaded bore 64 which is merged and aligned with the rear semicylindrical smaller portion 63b of the recess 63.

Engaged with the threaded bore 64 is a worm bearing bolt 80. That is, when the bolt 80 is rotated about its axis in the threaded bore 64, the same is moved toward or away from the bearing ball 70. A circular seat member 90 is disposed between the bearing ball 70 and an inside end 81 of the bolt 80. Thus, when the bolt 80 is turned by a certain degree in a direction to ove toward the bearing ball 70, the inside end 81 of the bolt 80 presses the worm 66 against a front wall 63d of the semicylindrical larger recess 63a with an interposal of the flange 76 of the front sleeve 75 therebetween.

Figure 12:
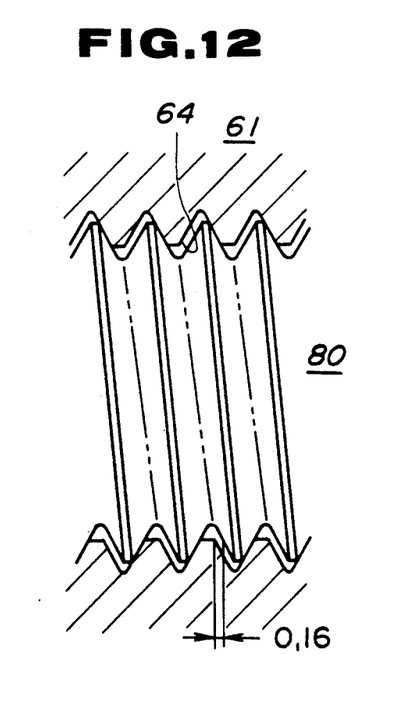
FIG. 12 is an enlarged sectional view of the essential part of the reduction gear of the first embodiment, showing in detail the condition in which a bolt is meshed with a threaded bore.

As is seen from FIG. 12, when the bolt 80 is properly engaged with the threaded bore 64, there is defined a clearance of about 0.16 mm between the associated threads of them.

Figure 1:
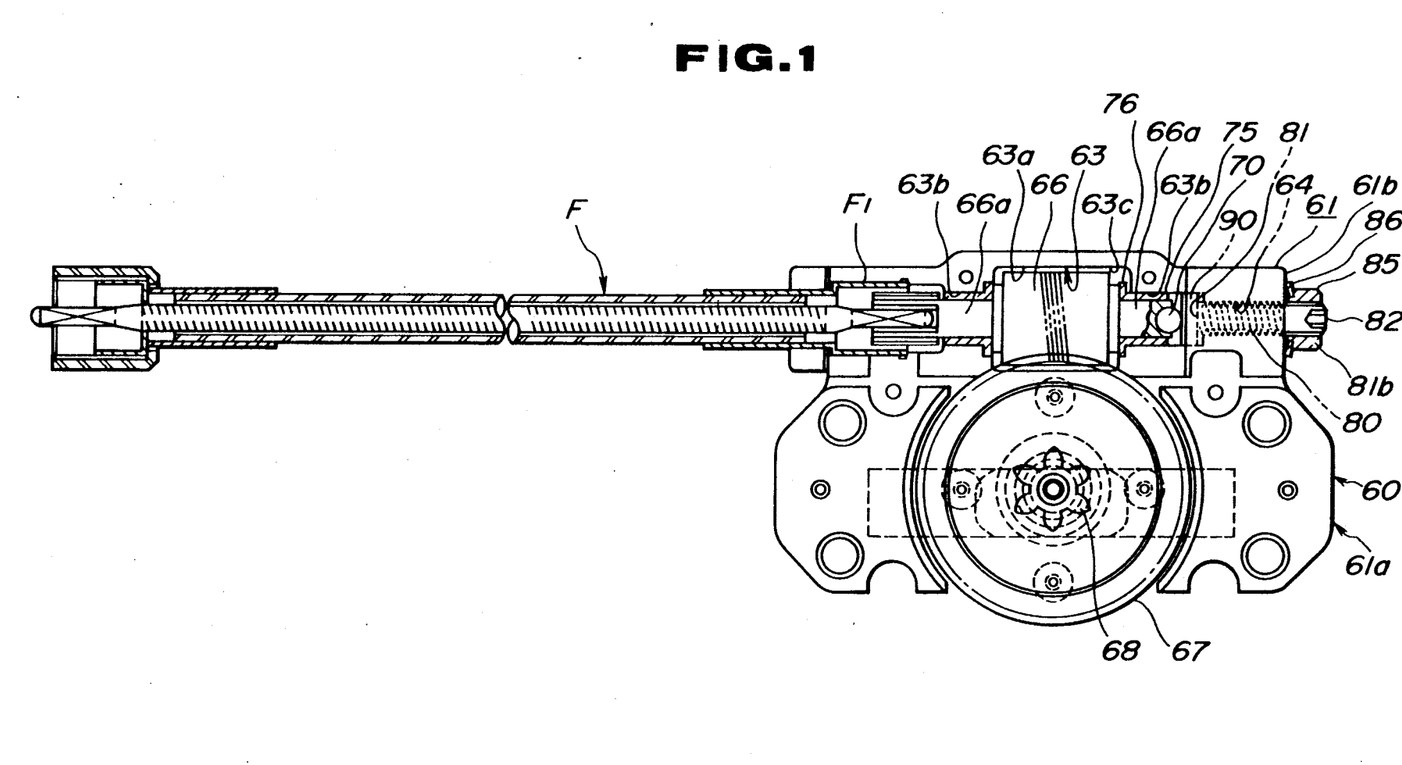
FIG. 1 is a partially cut plan view of a reduction gear which is a first embodiment of the present invention.
Figure 11:
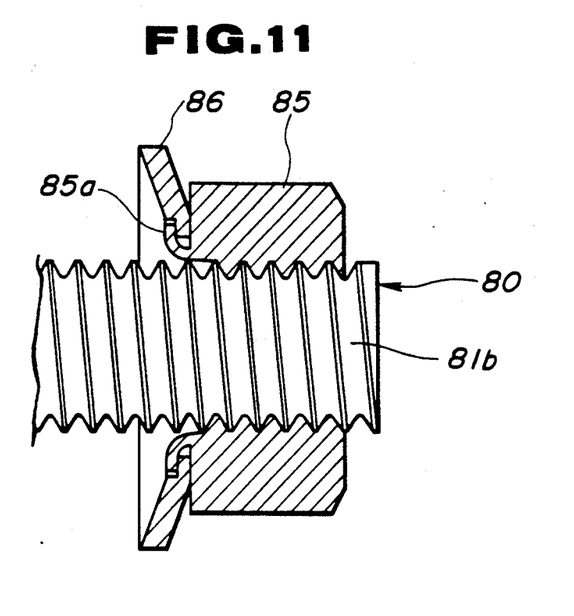
FIG. 11 is an enlarged sectional view of an essential part of the reduction gear of the first embodiment.

As is seen from FIGS. 1, 2 and 11, the outside end 81b of the bolt 80 is projected rearward from the threaded bore 64 and has a nut 85 disposed thereabout. The outside end 81b of the bolt 80 is formed with a hexagon bore 82 with which a hexagon tool (not shown) is engageable for manually turning the bolt 80. A wave washer 86 is coaxially connected to the nut 85 through a caulked portion 85a of the nut 85.

As is seen from FIG. 2, upon assembly, the wave washer 86 is compressed between a rear end 61b of the lower case part 61 and the nut 85 thereby to bias the nut 85 and thus the bolt 80 rearward. Thus, under this condition, as is seen in FIG. 12, the rear tapered surface of each thread of the bolt 80 is pressed against the front tapered surface of the corresponding thread of the threaded bore 64, and thus there is produced no play of the bolt 80 relative to the threaded bore 64.

In the following, the steps for assembling the drive device 60 to the upper rail 30 will be described with reference to the drawings.

First, as will be understood from FIG. 2, the bolt 80 is screwed into the threaded bore 64 of the lower case part 61 to such a degree that the wave washer 86 is somewhat compressed by the nut 85 to bias the nut 85 and thus the bolt 80 rearward.

Then, the circular seat member 90 is put into the rear semicylindrical smaller portion 63b from above and placed near the threaded bore 64.

Then, the lower case part 61 is tightly mounted to the flat main portion 31 of the upper rail 30.

If desired, the screwing of the bolt 80 into the threaded bore 64 and the putting of the circular seat member 90 into the rear semicylindrical smaller portion 63b may be carried out after the lower case part 61 is mounted to the upper rail 30.

Then, the leading end of the flexible drive cable F is put into the front semicylindrical smaller portion 63b of the recess 63 and the bearing ball 70 is put in the bore of the rotation shaft 66a.

Then, the worm 66 is positioned above the recess 63 to connect the leading end of the flexible cable F with the front end of the rotation shaft 66a of the worm 66.

Then, the worm 66 having the sleeves 75 on the rotation shaft 66a thereof is put into the recess 63 of the lower case part 61 from above.

With this, the worm 66 is neatly received in the semicylindrical larger portion 63a and the sleeves 75 on the rotation shaft 66a are neatly received in the front and rear semicylindrical smaller portions 63b of the recess 63. During this insertion, the worm 66 becomes meshed with the worm wheel 67 which has been positioned in a circular recess beside the recess 63. Furthermore, upon this, the enlarged terminal end F1 of the sleeve of the cable F is neatly received in the enlarged bore part of the front semicylindrical smaller portion 63b. Thus, the flexible drive cable F is properly connected to the lower case part 61.

Then, by using the hexagon tool, the bolt 80 is turned about its axis to be advanced toward the bearing ball 70. With this, the inside end 81 of the bolt 80 presses the circular seat member 90 against the bearing ball 70, and thus, moves the worm 66 forward in FIG. 2.

When the bolt 80 is turned by a certain degree, the front end of the worm 66 is brought into abutment with the front wall of the semicylindrical larger portion 63a of the recess 63 with an interposal of the flange 76 of the front sleeve 75 therebetween. Thus, under this condition, the worm 66 is suppressed from moving in fore-and-aft direction.

It is to be noted that this assembled condition can be viewed or checked by operator's eyes from outside through the opening 63c of the recess 63 of the lower case part 61.

Under this condition, due to the biasing force produced by the wave washer 86, the rear tapered surface of each thread of the bolt 80 is resiliently pressed against the front tapered surface of each thread of the threaded bore 64. Thus, undesirable play of the bolt 80 relative to the threaded bore 64 is suppressed.

The force with which the worm 66 is pressed against to the front wall of the semicylindrical larger portion 63b can be measured by using a suitable torque wrench.

Then, the nut 35 is turned relative to the bolt 80 in a direction to increase the biasing force produced by the wave washer 86. With this, the bolt 80 is tightly fixed to the lower case part 61.

Then. the upper case part 62 is mounted on the lower case part 61 to close the recess 63 of the lower case part 61. With this, the case 61a is assembled.

When, in operation, the electric motor 26 of the power unit 25 is energized to run in a given direction, the torque of the drive shaft 26a of the motor 26 is transmitted through the flexible drive cable F to the drive device 60 mounted on the upper rail 30. The torque transmitted to the drive device 60 then turns the pinion 68 meshed with the rack 44 of the lower rail 40 and thus moves the upper rail 30 forward or rearward relative to the lower rail 40. With this, the seat mounted on the upper rail 30 moves forward or rearward relative to the vehicle floor.

As will be understood from FIG. 8, during the movement of the seat, the rollers 51 run forward or rearward between the lower and upper rails 40 and 30 bearing a load vertically applied to upper rail 30. Furthermore, during the movement, the balls 52 run forward or rearward between the reinforcing plate 41 of the lower rail 40 and the wall portion 32 of the upper rail 30 bearing a load laterally applied to the upper rail 30.

When energization of the electric motor 26 is stopped, the movement of the upper rail 30 is stopped and thus the seat takes a new position.

Under this standstill condition, application of load to the seat does not induce movement of the upper rail 30 relative to the lower rail 40 because of the nature of the meshed engagement of the worm 66 and the worm wheel 67.

It is to be noted that usage of the plastic sliders 53 interposed between the lower and upper rails 40 and 30 can smooth the movement of the upper rail 30 relative to the lower rail 40. If desired, a grease may be applied to the plastic sliders 53 for achieving much smoother movement of the upper rail 30.

Figure 13:
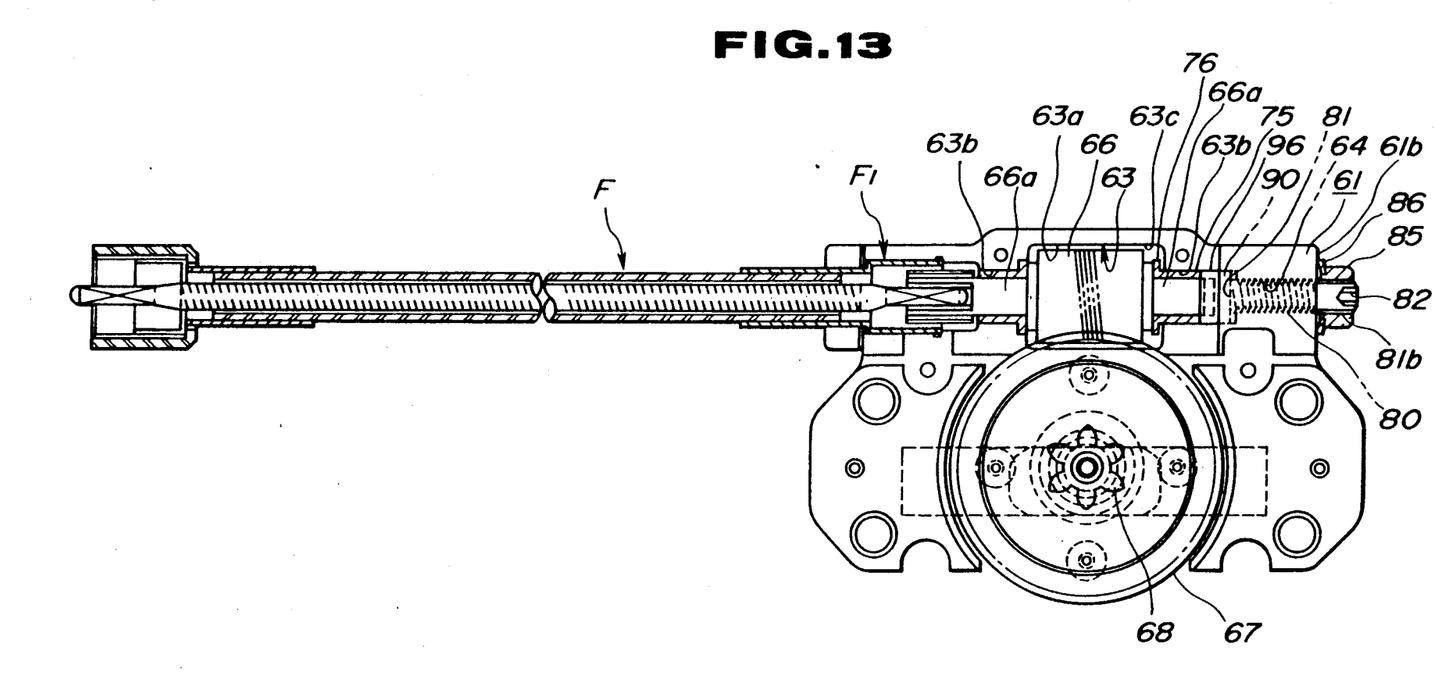
FIG. 13 is a view similar to FIG. 3, but showing a second embodiment of the present invention.
Figure 14:
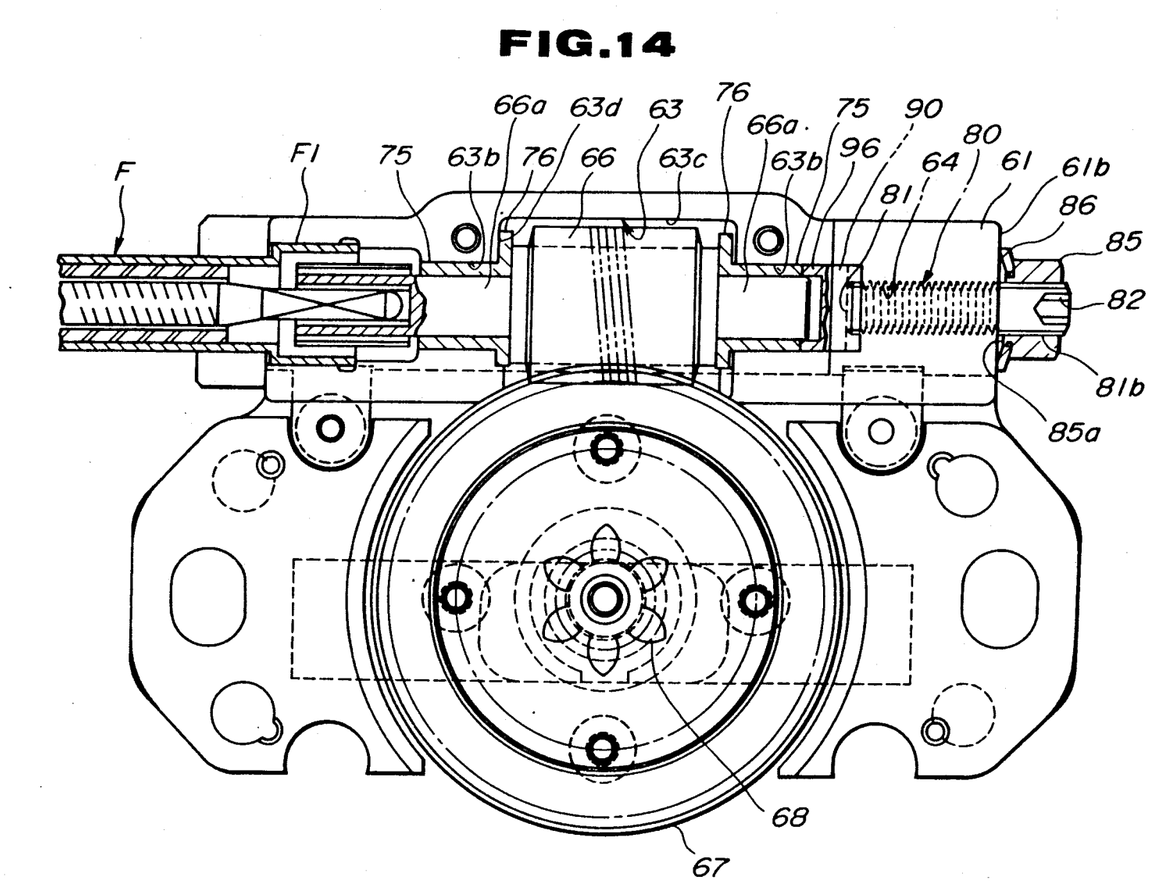
FIG. 14 is an enlarged view of an essential part of the reduction gear of the second embodiment.

Referring to FIGS. 13 and 14, there is shown a second embodiment of the present invention.

As is best seen from FIG. 14, in this second embodiment, an annular ring member 96 is used as a substitute for the bearing ball 70 used in the first embodiment. That is, the annular ring member 96 is disposed between the rear sleeve 75 and the circular seat member 90. Thus, when, due to turning of the bolt 80 in a given direction, the inside end 81 of the bolt 80 is pressed against the seat member 90, the seat member 90 presses the worm 66 against the front wall 63d of the recess 63 through the annular ring member 96 and the right sleeve 75.

Due to a so-called "surface contact" achieved between the rear sleeve 75 and the annular ring member 96, the transmission of biasing force applied from the bolt 80 to the worm 66 is much smoothly carried out. This means a much stable rotation of the worm 66 in the recess 63 as compared with the case of the afore-mentioned first embodiment.

As will be understood from the above description, in the present invention, the worm 66 can be put into recess 63 of the lower case part 61 through the opening 63c from above, and the assembled condition of the worm 66 in the recess 63 can be viewed or visually examined from outside of the lower case part 61 through the opening 63c of the same. Thus, assembly of the reduction gear is easily and precisely carried out.

What is claimed is;

1. A reduction gear comprising:
   a worm;
   a worm wheel meshed with said worm;
   a lower case part having a semicylindrical recess which is shaped and sized to rotatably receive said worm, said semicylindrical recess having an opening which is so sized as to permit insertion of said worm into said semicylindrical recess therethrough, said lower case part further having another recess for rotatably receiving said worm wheel;
   an upper case part which is to be mounted on said lower case part to close said semicylindrical recess of said lower case part;
   means for defining in said lower case part a threaded bore which is merged and aligned with said semicylindrical recess;
   a bolt screwed into said threaded bore, said bolt having an inside end which presses one axial end of said worm for achieving a stable rotation of said worm in said semicylindrical recess;
   bearing means disposed between said inside end of said bolt and said one axial end of said worm for assuring the stable rotation of said worm in said semicylindrical recess; and
   holding means for stationarily holding said bolt at a given position,
   wherein said worm has first and second shaft parts which extend coaxially outwardly in opposite directions from axial terminal ends of the worm, said second shaft part extending toward said inside end of said bolt; and
   wherein said bearing means includes a first sleeve coaxially disposed about said first shaft part; a second sleeve coaxially disposed about said second shaft part, and annular ring member having an annular portion which is in contact with an outside end of said second sleeve; and a circular seat member disposed between said inside end of said bolt and said annular ring member.

2. A reduction gear as claimed in claim 1, in which said holding means comprises:
   a nut operatively disposed about said bolt; and
   a wave washer compressed between said nut and an external wall of said lower case part thereby to bias said nut and thus said bolt in a direction away from said worm.

3. A reduction gear comprising:

a worm having first and second shaft parts which extend coaxially outwardly in opposite directions from axial terminal ends of said worm;

first and second sleeves coaxially disposed about said first and second shaft parts respectively;

a worm wheel meshed with said worm;

a lower case part having a semicylindrical recess which is shaped and sized to rotatably receive said worm, said semicylindrical recess having an opening which is so sized as to permit insertion of said worm into said semicylindrical recess therethrough, said lower case part further having another recess for rotatably receiving said worm wheel;

an upper case part which is to be mounted on said lower case part to close said semicylindrical recess of said lower case part;

means for defining in said lower case part a threaded bore which is merged and aligned with said semicylindrical recess;

a bolt screwed into said threaded bore, said bolt having an inside end which presses one axial end of said worm for achieving a stable rotation of said worm in said semicylindrical recess, said bolt having an outside end portion projected outward from said threaded bore;

mutually contacting first and second bearing members which are disposed between said inside end of said bolt and either one of said second shaft part and said second sleeve for promoting the stable rotation of said worm in said semicylindrical recess; and holding means for stationarily holding said bolt at a given position relative to said lower case, said holding means including a nut operatively disposed about said outside end portion of said bolt, and a wave washer compressed between said nut and an external wall of said lower case part, said wave washer being coaxially secured to a caulked portion of said nut.

4. A reduction gear as claimed in claim 3, in which said first bearing member is a bearing ball rotatably received in a bore formed in an end of said second shaft part of the worm and in which said second bearing member is a circular seat member disposed between said inside end of said bolt and said bearing ball.

5. A reduction gear as claimed in claim 3, in which said first bearing member is an annular ring member having an annular portion which is in contact with an outside end of said second sleeve, and in which said second bearing member is a circular seat member disposed between said inside end of said bolt and said annular ring member.

6. A power seat slide device for a motor vehicle, comprising:

a lower rail secured to a floor of said vehicle, said lower rail having a longitudinally extending rack;

an upper rail slidably engaged with said lower rail;

a power unit carried by said upper rail;

a power transmission cable extending from said power unit and;

a reduction gear mounted on said upper rail and driven by said power unit through said power transmission cable; and a pinion driven by said reduction gear and meshed with said rack of said lower rail, wherein said reduction gear comprising:

a worm;

a worm wheel meshed with said worm; a lower case part secured to said upper rail and having a semicylindrical recess which is shaped and sized to rotatably receive said worm, said semicylindrical recess having an opening which is so sized as to permit insertion of said worm into said semicylindrical recess therethrough, said lower case part further having another recess for rotatably receiving said worm wheel;

an upper case part which is to be mounted on said lower case part to close said semicylindrical recess of said lower case part;

means for defining in said lower case part a threaded bore which is merged and aligned with said semicylindrical recess;

a bolt screwed into said threaded bore, said bolt having an inside end which presses one axial end of said worm for achieving a stable rotation of said worm in said semicylindrical recess;

bearing means disposed between said inside end of said bolt and said one axial end of said worm for assuring the stable rotation of said worm in said semicylindrical recess; and holding means for stationarily holding said bolt at a given position.

7. A power seat slide device as claimed in claim 6, in which said worm has a rotation shaft which includes a first shaft part projected from one axial end of said worm and a second shaft part projected from the other axial end of said worm.

8. A power seat slide device as claimed in claim 7, in which said bearing means comprises:

a first sleeve coaxially disposed about said first shaft part of said worm; and a second sleeve coaxially disposed about said second shaft part of said worm.

9. A power seat slide device as claimed in claim 8, in which said bearing means further comprises:

a bearing ball rotatably received in a bore formed in an end of said second shaft part of said worm; and an annular seat member disposed between said inside end of said bolt and said bearing ball.

10. A power seat slide device as claimed in claim 9, in which each sleeve has at its inside end an annular flange which is disposed between said worm and a wall of said semicylindrical recess.

11. A power seat slide device as claimed in claim 8, in which said bearing means further comprises:

an annular ring member having an annular portion which is in contact with an outside end of said second sleeve; and an annular seat member disposed between said inside end of said bolt and said annular ring member.

12. A power seat slide device as claimed in claim 8, in which said semicylindrical recess of said lower case part comprises:

a larger portion into which said worm is coaxially received; and first and second smaller portions which positioned at the front and rear of said larger portion for coaxially receiving said first and second shaft parts of said rotation shaft of said worm.

* * * * *